United States Patent [19]

Worrallo

[11] Patent Number: 4,485,597
[45] Date of Patent: Dec. 4, 1984

[54] FRAME WORK JOINTS

[76] Inventor: Anthony C. Worrallo, 15 Sprott Rd., Auckland 5, New Zealand

[21] Appl. No.: 418,656

[22] Filed: Sep. 16, 1982

[30] Foreign Application Priority Data

Sep. 18, 1981 [NZ] New Zealand .................. 198408
May 4, 1982 [NZ] New Zealand .................. 200513

[51] Int. Cl.³ ............................................. F16B 7/04
[52] U.S. Cl. ..................................... 52/36; 52/475;
52/690; 52/488; 403/405; 403/297
[58] Field of Search ............... 52/690, 696, 488, 475,
52/36, 127.7, 127.11, 665; 403/405, 297

[56] References Cited

U.S. PATENT DOCUMENTS

| 2,850,304 | 9/1958 | Wagner | 403/297 |
|---|---|---|---|
| 3,574,367 | 4/1971 | Jankowski | 403/297 X |
| 3,829,226 | 8/1974 | Kreusel | 403/297 X |
| 3,966,342 | 6/1976 | Moriya | 52/690 X |

FOREIGN PATENT DOCUMENTS

| 2103504 | 7/1972 | Fed. Rep. of Germany | 403/297 |
|---|---|---|---|
| 2108342 | 9/1972 | Fed. Rep. of Germany | . |
| 2222433 | 11/1972 | Fed. Rep. of Germany | 402/297 |
| 1361398 | 4/1964 | France | . |
| 2000838 | 1/1969 | France | . |
| 2129259 | 10/1972 | France | . |
| 2297020 | 8/1976 | France | . |
| 2508120 | 12/1982 | France | . |
| 686249 | 1/1953 | United Kingdom | 403/297 |

Primary Examiner—Henry E. Raduazo
Attorney, Agent, or Firm—Roylance, Abrams, Berdo & Goodman

[57] ABSTRACT

A joint for connecting together two or three framework members is disclosed. In one form there are two framework members which intersect. Inside one of the members there are two arms which protrude from one end of that member. The protruding portion of each arm has a groove therein and a tooth beyond the groove. The grooves and teeth face away from one another. The other member has an internal cavity with a slot-like entrance to the cavity bounded by lips. When the protruding ends of the arms are close to one another, the arms can be inserted through the slot-like entrance so that the lips enter the grooves and the teeth hook behind the lips. A screw passes through one of the arms and this can be tightened to that it bears on the other of the arms to force them apart and into engageent with the lips. A resilient clip holds the other ends of the arms together and simultaneously urges said one ends apart whereby, before the screw is tightened, there is sufficient friction to hold the arms in position with respect to the lips. The arms can be substantially symmetrical in form with a tooth and groove at each end so that when the resilient clip is removed, the arms can be used for connecting two parallel members.

20 Claims, 8 Drawing Figures

FRAME WORK JOINTS

This invention relates to joints for connecting together members of, for example, a framework.

BACKGROUND TO THE INVENTION

There are many constructions in which two or more members must be secured to one another in a simple and reliable manner. Examples of such constructions are shelving systems, frameworks for display and other cabinets and partition systems.

Many proposals have been made which involve the use of a pair of locking arms which are received within the hollow interior of one of the members to be joined. The arms protrude from one end of said one member and the protruding portions of the arms are entered in an aperture or slot in the wall of the other member. The protruding portions each have an outwardly directed tooth thereon. The protruding portions are forced apart so that they engage with the wall parts which bound the slot, the teeth hooking behind said wall parts to prevent the protruding portions being withdrawn from the slot or aperture. In many forms, screws are employed to force the arms apart so that the protruding portions engage said wall parts.

In a structure developed by applicant, the arms are of elongate form with curved surfaces at each end. The arms are presented to the slot or aperture in a diverging relationship, the arms touching at one end and being spaced apart at the other. It is the touching ends of the arms which are presented to and enter the slot or aperture. When the spaced ends are sqeezed together, said surfaces of the arms at said one end roll on one another and said portions move apart into engagement with said wall parts. Such rolling action continues until the arms are parallel and back-to-back. Said one member, which is hollow, is then slid over the arms to hold them in their parallel relationship.

It is sometimes desirable to be able to connect together three members, two of the members being spaced apart, and the third member spanning the gap between these two members. In structures of the form described above, this would be achieved by using two pairs of arms, each pair connecting the third member to a respective one of the other members.

BRIEF SUMMARY OF THE INVENTION

An object of the present invention is to provide a joint which includes a single pair of arms connecting two spaced members to one another.

According to one aspect of the present invention there is provided, in a construction including first and second members which are spaced apart and each of which has an opening therein bounded by wall parts, a joint comprising a pair of arms spanning between said members and having the end portions thereof entered in said openings in the first and second members, there being teeth on said end portions which teeth engage behind said wall parts to prevent the arms being withdrawn from said openings, and means for forcing said arms apart and into engagement with said wall parts.

To enable the arms to be forced apart into engagement with said wall parts, one of said arms can have a tapped bore therein, there being a screw in said bore which bears on the other arm to force the arms apart and into engagement with said wall parts.

If desired a second tapped bore and a second screw can be provided, the screws being spaced apart along the arms.

To prevent slipping of the arms with respect to one another, those surfaces of the arms which face one another can each be formed with a rib and a groove, the groove of each arm receiving the rib of the other arm when the arms are in juxtaposed relationship.

A difficulty with a number of the prior art constructions of which applicant is aware is that they are difficult to manipulate as they comprise at least the two members to be joined, the two arms and quite often springs and other components. A screw is provided which, when tightened, urges the arms apart. Where springs are provided, these urge the arms together as the screw is slackened so that the arms move together and can be removed from, or inserted in, the aperture or slot.

Another object of the present invention is to provide a joint in which manipulation is simpler than in the prior art proposals.

According to another aspect of the present invention there is provided, in a construction including a member which has an opening therein bounded by wall parts, a joint comprising a pair of arms each having one end portion thereof entered in said opening, each of said one end portions including a tooth and the teeth engaging behind said wall parts to prevent withdrawal of said one end portions from said opening, the other end portion of each arm including a further tooth, the further teeth being directed away from one another and there being a clip engaged with said other end portions and preventing said other end portions from moving apart, the clip including two end sections and a connecting section joining said end sections, the end sections each having a recess therein and one of said further teeth being in each recess.

In one form said clip is of resilient material and further includes a central portion received between those surfaces of said arms which face one another, said central portion including a pair of diverging limbs which bear one on each arm and are deflected towards one another to reduce the angle between them when said one end portions are displaced towards one another.

The construction can further include a hollow member, said clip and arms, apart from said one end portions, being within said hollow member.

It is also possible for said other end portions of the arms to have grooves in those surfaces thereof which are directed away from one another, each of said further teeth lying between the other end of the respective arm and the groove of that arm, and said end sections of the clip including projections which seat in said grooves.

BRIEF DESCRIPTION OF THE DRAWINGS

For a better understanding of the present invention, and to show how the same may be carried into effect, reference will now be made, by way of example, to the accompanying drawings in which.

DETAILED DESCRIPTION

Figure 1:
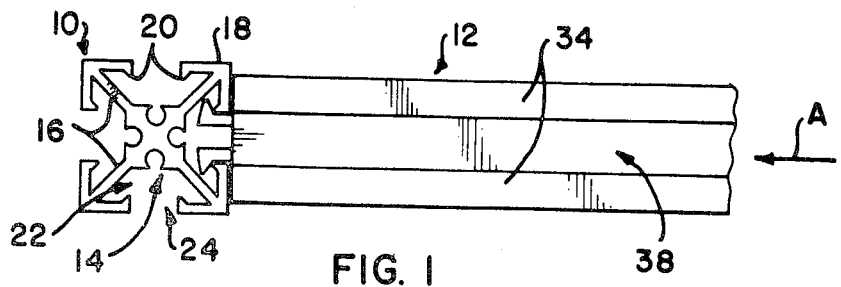
FIG. 1 is a top plan view of a joint between two members of a framework which members are at right angles to one another.

Referring firstly to FIGS. 1 to 4, a vertical member 10 and a horizontal member 12 are shown. The vertical member 10, which is preferably an aluminium extrusion, has a central core 14 with four arms 16 radiating from the core. Each arm 16 is at right angles with respect to the adjacent arms. At the outer end of each arm 16 there is a right angled element 18, each limb of each right angled element having a lip 20 extending along the free edge thereof. This structure provides four cavities 22 and a slot-like entrance 24 to each cavity. The entrances 24 are bounded by those edges of the elements 18 which have the lips 20 extending therealong.

The member 12, which is also preferably constituted by an aluminium extrusion, comprises (see particularly FIG. 3) a vertical web 26 and two vertically spaced, horizontal flanges 28 protruding from one face of the web 26. The web 26 extends both above the top flange 28 and below the bottom flange 28 and has, along each of the free edges thereof, an element 30. The elements 30 are at right angles to the web 26 and each has a lip 32 along the free edge thereof.

Along the free edge of each flange 28 there is an element 34 which, in section, is of right angled form. Along one free edge of each element 34 there is a lip 36. It will be seen that the lips 32 and 36 bound two slot-like entrances 38 leading to two cavities 40. Portions 42 of the elements 34 protrude towards one another and bound a slot-like entrance 44 to the main cavity 46 of the member 12.

Figure 4:
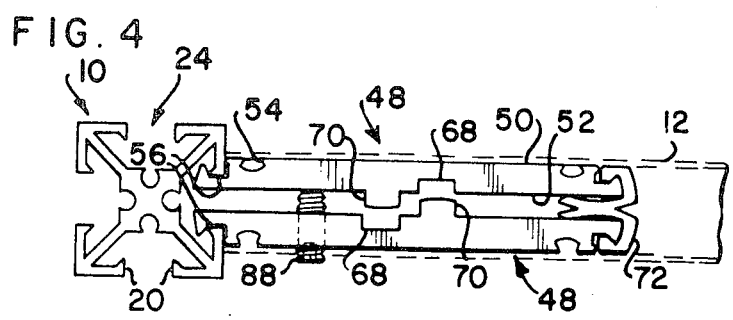
FIG. 4 is a top plan view of the joint of FIG. 1 with the horizontal member removed.

Turning now to FIG. 4, reference numerals 48 designate two locking arms which join the members 10 and 12. One of these arms can also be seen in FIG. 2 and a small portion of each arm can be seen in FIG. 1. Each arm 48 comprises an outer face 50 and an inner face 52. In the faces 50 there are horizontally spaced, re-entrant grooves 54. By 're-entrant' is meant that the grooves 54 have slot-like entrances which are narrower than inner parts of the grooves. Between each groove 54 and the adjacent end of the arm 48 there is a further groove 56 (see particularly FIG. 5). Each groove 56 has one bounding face 58 which intersects the face 50 at right angles and a face 60 which is oblique to the face 50, the faces 58 and 60 being so arranged that the mouth of each groove 56 is wider than its base. Protrusions 62 are provided where the faces 58 intersect the faces 50. The faces 60 of the grooves 56 intersect curved end faces 64 of the arms 48 to form teeth 66. It will be noted that the apex of each tooth 66 is set back with respect to the face 50.

Each face 52 has therein a groove 68 of rectangular cross section and each groove 68 lies just to one side of the centre of its arm. On the other side of the centre of each arm there is a rib 70. The rib 70 has side faces which are at right angles to the face 52 and a top face which is arcuate when viewed in section. The groove 68 of each arm 48 receives the rib 70 of the other arm.

It will be noted from FIG. 4 that the arms 48 are of the same cross sectional shape, one being rotated through 180° about a transverse central axis with respect to the other. The arms can be produced by extruding an aluminium bar of the desired cross sectional form and then cutting it transversely.

A spring clip 72 (see particularly FIG. 5) of resilient synthetic plastics material secures the arms 48 to one another at the end remote from the member 10 and prevents these ends of the arms 48 moving apart. The clip 72 comprises a central portion 76 which lies between the faces 52 and a connecting section in the form of two hook portions 78. The hook portions 78 extend from the central portion 76 to beyond the ends of the arms 48 and curve around to join end sections 80 of the clip. The end sections 80 lie outwardly of the arms 48 and each includes a projection which seats in the groove 56 and a recess which receives one of the teeth 66. The central portion 76 includes two diverging limbs 82 which bear one on each arm 48.

One of the arms 48 is drilled and tapped at 84 and 86 (see FIG. 2) so that it is capable of receiving two Allen screws one of which is shown at 88. As will be described in more detail hereinafter, the single Allen screw, when tightened, is normally sufficient to cause the members 10 and 12 to be secured to one another but there are instances where two Allen screws are preferred.

To connect the members 10 and 12, the arms 48 are pushed into the main cavity 46 of the member 12. The member 12 is orientated with respect to the arms 48 so that the Allen screw moves along the entrance 44 to the main cavity 46 (see particularly FIGS. 2 and 3).

Figure 2:
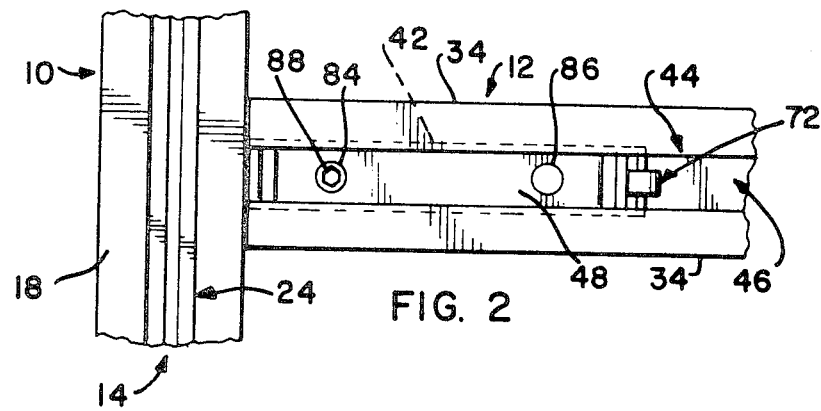
FIG. 2 is a side elevation of the joint of FIG. 1.

To attach the arms 48 to the member 10, the Allen screw 88 is turned until its inner end lies within the arm 48. The ends of the arms 48 remote from the clip 72 are then squeezed towards one another so that the arms converge and the tips thereof adjacent the teeth 66 touch. Where the arms 48 are within the member 12 as shown in FIG. 2, squeezing is achieved by pressing on the screw 88. Squeezing causes the limbs 82 to be deflected and reduces the angle between them so that a restoring force tending to displace the arms 48 back to their parallel condition comes into existence. The arms 48 are then presented to one of the entrances 24. In their converging condition, the width of the pair of arms, measured across the crests of the teeth 66, is less than that of the entrance 24. Thus the teeth 66 enter the cavity 22. When the pressure holding the arms 48 in their converging condition is released, the portions 82 force the arms apart so that the lips 20 enter the grooves 56. The force exerted by the limbs 82 of the clip 72 is such that there is sufficient friction between the member 10 and the arms 48 to prevent the arms 48 from slipping down the member 10. The Allen screw 88 is then tightened so that its inner end moves across the gap between the arms 48 and bears on the other arm to force them apart. This has the effect of forcing the arms 48 into engagement with the elements 18 of the member 10.

Figure 3:
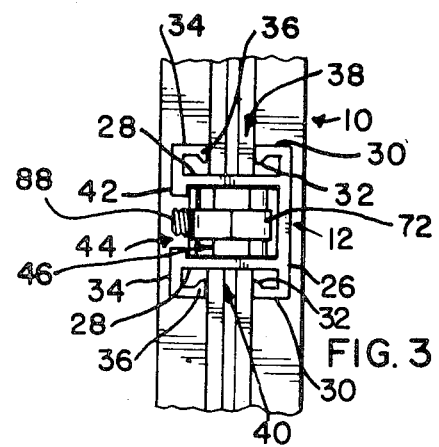
FIG. 3 is a view of the joint of FIG. 1 taken in the direction of the arrow A in FIG. 1.

If the web 26 has a hole drilled in it at a suitable point, the member 12 can be rotated through 180° about its longitudinal axis with respect to the position shown in FIG. 3. When the drilled hole is aligned with the tapped bore 84 the Allen screw is inserted.

In any circumstance where the frictional force exerted by the deflected limbs 82 is not required, the portion 76 and the limbs 82 can be omitted. In such circumstances, resilient material is not required and a short length of an aluminium or non-resilient synthetic plastics material extrusion suffices. A clip of this nature prevents the end portions of the arms 48 from moving apart but exerts no significant restoring force. It will be understood that all the forms of clip disclosed protect the teeth 66 with which they are associated. Should the left hand teeth in FIGS. 1, 2 and 4 be damaged, then the arms 48 can be turned around and the teeth 66 previously covered by the clip brought into use.

Figure 6:
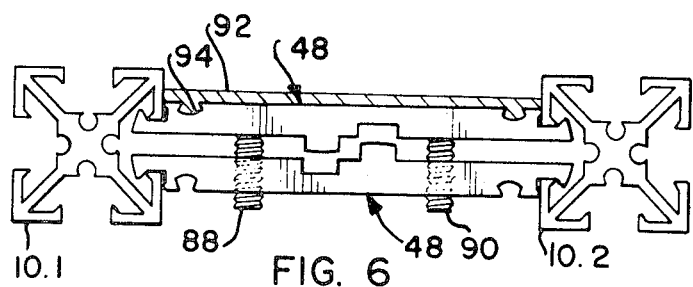
FIG. 6 is a top plan view of a joint between two parallel members.
Figure 7:
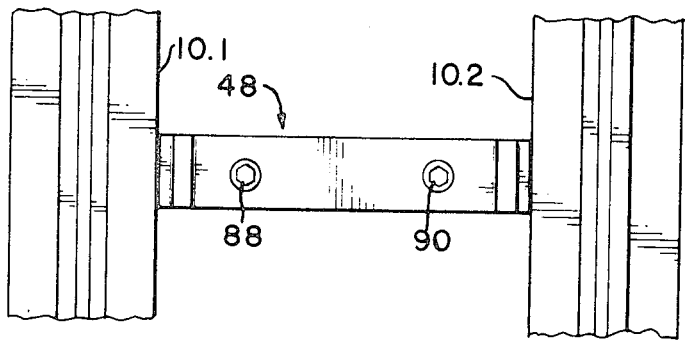
FIG. 7 is a rear elevation of the joint of FIG. 5.

In FIGS. 6 and 7, the clip 72 has been omitted and the arms 48 join two members 10.1 and 10.2. It will be noted that the relationship between the arms 48 and the members 10.1 and 10.2 is the same as that between the arms 48 and the member 10 in FIG. 1. For extra security against slipping, a second Allen screw 90 is inserted in the tapped bore 86. When the Allen screws 88 and 90 are tightened, the ends of the arms 48 are forced apart into engagement with the elements 18 of the members 10.1 and 10.2.

There can be several pairs of arms 48 joining the members 10.1 and 10.2. For example, the members 10.1 and 10.2 can be elongate columns and there can be a series of vertically spaced pairs of arms 48 joining the columns. To conceal the arms 48 a cover strip 92 (FIG. 6) can be provided. The cover strip 92 has two ribs 94 on the rear face thereon, the cross sectional shape of the ribs 94 being compatible with that of the grooves 54 so that the ribs 94 can snap into the grooves 54 and hold the cover strip 92 in place.

Figure 8:
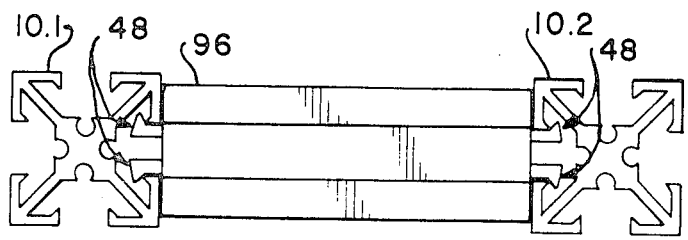
FIG. 8 is a plan view of a further joint between two parallel members.

In FIG. 8 the arms are enclosed by a member designated 96. The cross section of the member 96 can be the same of that as the member 12 and the member can be of a length such that only those portions of the arms 48 which lie outwardly of the faces 58 protrude therefrom.

It will be understood that the illustrated and described cross sectional shapes of the members 10 and 12 are by way of example only. Provided the vertical member has a cavity with a slot like entrance into which the arms 48 can be inserted, then the cross sectional shape of the remainder of the vertical member can be of any desired form. Simply by way of example, the lips 32 and 36 of the member 12, which define the entrance 38, will also receive the arms 48. Thus the members 10.1 and 10.2 in FIG. 6 could, if desired, be replaced by two members having the cross sectional shape of the member 12. Furthermore, provided the member 12 has a main cavity 46 which is capable of receiving the two arms 48, the remaining features of the member can be varied depending on the additional functions that the member is to perform.

It will be understood that the grooves 68 and ribs 70 are not essential and can be omitted. Likewise, if no cover strip 92 is to be used, then the grooves 54 are not required.

The arms 48 can, as described, be cut from extruded stock or can be cast in 'left' and 'right' hand forms. For some purposes a single tapped bore 84 or 86 is adequate and this bore can be at the centre of the arm.

Figure 5:
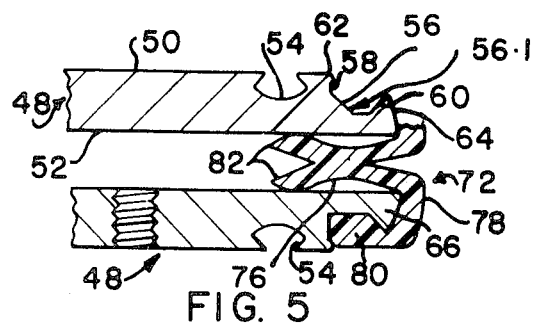
FIG. 5 is a detail, to a larger scale, of the joint of FIGS. 1 to 4.

In the angle between the face 58 of each groove 56 and its bottom wall there can be a protruding tooth 56.1 (FIG. 5). This tooth can only be provided in the die cast form. When the arms 48 are forced apart, the teeth 56.1 bite into the lips 20 to further improve the grip. The tooth, measured at right angles to the section of FIG. 5, is relatively narrow to enhance its ability to bite into the lip. Two or more teeth 56.1 can be provided in each groove 56, the teeth 56.1 being spaced apart across the groove 56.

The illustrated member 12 can be replaced by a tube of rectangular cross section. A hole drilled in its walling receives the Allen screw.

To enable the members 10 and 12 to intersect at other than 90°, the arms 48 are cut from two pieces of extruded stock. Before cutting, a further extrusion having the cross-sectional shape of the clip 72 is used to hold the two pieces of extruded stock together. When cutting takes place it does so at, for example, 30, 45 or 60 degrees to the edge of the extruded stock. The end of the member 12 is cut at the same angle.

I claim:

1. An apparatus, comprising:
   first and second spaced apart, non-coaxial members, each of the members having an opening bounded by wall parts;
   a pair of substantially identical arms extendable between said members, each of said arms having first and second end portions engagable within said openings of said first and second members, respectively, one arm being the mirror image of the other arm;
   teeth on said end portions engagable behind said wall parts of said members to prevent withdrawal of said arms from said openings; and
   clamping means for forcing said arms apart and into engagement with said wall parts.

2. An apparatus according to claim 1 wherein said clamping means comprises an internally threaded bore in one of said arms receiving a screw which bears against the other of said arms and forces said arms apart.

3. An apparatus according to claim 1 wherein said clamping means comprises an internally threaded bore in each of said arms, each said bore receiving a screw which bears against the opposite arm and forces said arms apart.

4. An apparatus according to claim 3 wherein said arms have inner surfaces facing each other and outer surfaces facing in opposite directions, each of said inner surfaces having a rib and a groove mating with the groove and rib of the other of said inner surfaces.

5. An apparatus according to claim 2 wherein said arms have inner surfaces facing each other and outer surfaces facing in opposite directions, each of said inner surfaces having a rib and a groove mating with the groove and rib of the other of said inner surfaces.

6. An apparatus according to claim 1 wherein said arms have inner surfaces facing each other and outer surfaces facing in opposite directions, each of said inner surfaces having a rib and a groove mating with the groove and rib of the other of said inner surfaces.

7. An apparatus according to claim 3 wherein said arms are located within a hollow third member extending angularly between said first and second members, said end portions of said arms protruding from opposite ends of said third member.

8. An apparatus according to claim 2 wherein said arms are located within a hollow third member extending angularly between said first and second members, said end portions of said arms protruding from opposite ends of said third member.

9. An apparatus according to claim 1 wherein said arms are located within a hollow third member extending angularly between said first and second members, said end portions of said arms protruding from opposite ends of said third member.

10. An apparatus according to claim 1 wherein a cover strip is secured to one of said arms and extends between said first and second members concealing a gap defined therebetween.

11. An apparatus according to claim 10 wherein said arms have inner surfaces facing each other and outer surfaces facing in opposite directions, one of said outer surfaces having a slot therein extending transverse to a longitudinal axis of the respective arm; and said cover strip comprises a rib received in said slot to secure said cover strip to the respective arm.

12. An apparatus according to claim 1 wherein each of said end portions of said arms has a groove, the tooth of each of said end portions being between the respective groove and an adjacent free end of one of said arms.

13. An apparatus for forming a non-coaxial joint with a member having an opening defined by wall parts, comprising:
  first and second substantially identical arms, each of said arms having first and second end portions, said first end portions being extendable through the opening in the member;
  first and second teeth extending from each of said first and second end portions, respectively, said first teeth being engaged behind the wall parts of the member preventing withdrawal of said first end portions from the opening, said second teeth extending in opposite directions;
  a clip engaging said second end portions and preventing said second end portions from moving apart, said clip including two end sections and a connecting section joining said end sections, each of said end sections having a recess receiving one of said second teeth; and
  resilient means, mounted between said arms adjacent said second end portions, for biasing said first end portions away from each other.

14. An apparatus for forming a joint with a member having an opening defined by wall parts, comprising:
  first and second substantially identical arms, each of said arms having first and second end portions, said first end portions being extendable through the opening in the member;
  first and second teeth extending from each of said first and second end portions, respectively, said first teeth being engaged behind the wall parts of the member preventing withdrawal of said first end portions from the opening, said second teeth extending in opposite directions; and
  a clip engaging said second end portions and preventing said second end portions from moving apart, said clip including two end sections and a connecting section joining said end sections, each of said end sections having a recess receiving one of said second teeth, said clip being formed of resilient material and having a central portion extending between said arms and biasing said arms away from each other.

15. An apparatus according to claim 14 wherein said end sections of said clip overlie oppositely facing outer surfaces of said arms and comprise projections received in recesses in said outer surfaces.

16. An apparatus according to claim 15 wherein said arms and said clip are located with a hollow member, said first end portions protruding from said hollow member.

17. An apparatus according to claim 14 wherein said arms and said clip are located with a hollow member, said first end portions protruding from said hollow member.

18. An apparatus according to claim 13 wherein said arms and said clip are located with a hollow member, said first end portions protruding from said hollow member.

19. An apparatus according to claim 13 wherein said second end portions of arms have grooves opening in opposite directions, said second teeth being between said grooves and free ends of said second end portions, said end sections of said clip having projections seated in said grooves.

20. An apparatus according to claim 12 wherein said first and second members comprise extrusions having longitudinally extending slots defined by inwardly extending flanges forming said wall parts, said flanges being received in said grooves.

* * * * *